United States Patent
Liu et al.

(10) Patent No.: US 7,198,338 B2
(45) Date of Patent: Apr. 3, 2007

(54) MOUNTING APPARATUS FOR DATA STORAGE DEVICES

(75) Inventors: Ali Liu, Tu-Chen (TW); Chen-Lu Fan, Tu-Chen (TW); Li-Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 385 days.

(21) Appl. No.: 10/810,121

(22) Filed: Mar. 25, 2004

(65) Prior Publication Data

US 2004/0189163 A1 Sep. 30, 2004

(30) Foreign Application Priority Data

Mar. 25, 2003 (TW) .............................. 92204607 U

(51) Int. Cl.
*G12B 9/00* (2006.01)

(52) U.S. Cl. .................... 312/223.1; 312/350; 361/727

(58) Field of Classification Search ............ 312/223.2, 312/223.1, 330.1, 350, 332.1; 361/724, 725, 361/726, 727

See application file for complete search history.

(56) References Cited

U.S. PATENT DOCUMENTS

| | | | |
|---|---|---|---|
| 5,262,923 A * | 11/1993 | Batta et al. ................. | 361/685 |
| 6,099,098 A | 8/2000 | Leong | |
| 6,299,266 B1 | 10/2001 | Justice et al. | |
| 6,313,985 B1 * | 11/2001 | Chen et al. .................. | 361/685 |
| 6,396,686 B1 * | 5/2002 | Liu et al. .................... | 361/685 |
| 6,442,020 B1 * | 8/2002 | Liu et al. .................... | 361/683 |
| 6,469,889 B1 * | 10/2002 | Gan .......................... | 361/685 |
| 6,590,766 B2 * | 7/2003 | Sheng-Hsiung et al. .... | 361/685 |
| 6,590,775 B2 * | 7/2003 | Chen ......................... | 361/725 |
| 6,654,240 B1 * | 11/2003 | Tseng et al. ................ | 361/685 |
| 6,826,045 B2 * | 11/2004 | Chen ......................... | 361/685 |
| 6,999,309 B2 * | 2/2006 | Hsu .......................... | 361/685 |
| 2003/0184964 A1 * | 10/2003 | Neukam et al. ............ | 361/685 |

* cited by examiner

*Primary Examiner*—Janet M. Wilkens
(74) *Attorney, Agent, or Firm*—Wei Te Chung

(57) ABSTRACT

A mounting apparatus for mounting a data storage device (20) includes a drive bracket (10) and at least one slide rail (40) attached to the data storage device. The drive bracket comprises two side walls (14), at least one of the side walls being provided with a supporting plate (16) thereon and defining a first opening (18) thereof. The slide rail comprises a main body (50, 60) having a fastening section (62) and a stopper (64), and a handle (70) demountably attached to the main body. The handle defines a second opening (73) for engaging with the fastening section and stopper of the main body to attached the handle to the main body. The fastening section and stopper extend from the second opening of the handle for further engaging in the first opening of the drive bracket, the data storage device is thus attached to the drive bracket.

21 Claims, 7 Drawing Sheets

MOUNTING APPARATUS FOR DATA STORAGE DEVICES

BACKGROUND OF THE INVENTION

1. Field of the Invention

The present invention relates to a mounting apparatus for use, in particular, in readily securing one or more data storage device units or similar units in position on a support structure such as the chassis of a computer.

2. Prior Art

A popular means for mounting a data storage device in a computer chassis involves a pair of rails that is attached to side walls of the data storage device. The data storage device with the rails secured thereto is slid into the chassis from a front of the chassis, and fastened in place.

This type of rail is shown in FIG. 7. The rail comprises a body 2, a fastener 5 and an operation portion 6 extending integrally from the body 2. When pressure is applied to the operation portion 6 of the rail, the rail deforms so that the fastener 5 of the body 2 is fastened in or released from an opening (not shown) of the computer chassis. A similar example can be found in U.S. Pat. No. 6,088,098.

When mounting or dismounting the data storage device to or from the chassis, an operator must exert sufficient pressure in directions perpendicular to the rails in order to engage or disengage the fasteners 5 in or from the openings of the chassis. However, with the trend toward downsizing of computers, the operating space inside and around a modem computer chassis can be very limited. When the space is very limited, it can be difficult or even impracticable to apply sufficient pressure on the operation portions 6. In this situation, the data storage device may not be able to be mounted in chassis, or may be mounted only after considerable trouble and delay.

Thus, a mounting apparatus for data storage devices which overcomes the above-mentioned problems is desired.

SUMMARY OF THE INVENTION

Accordingly, an object of the present invention is to provide a mounting apparatus for readily mounting one or more data storage devices in a computer chassis, in particular, in a small sized computer chassis.

Another object of the present invention is to provide a mounting apparatus for readily removing one or more data storage devices from a computer chassis, in particular, in a small sized computer chassis.

To achieve the above-mentioned objects, a mounting apparatus of the present invention for mounting a data storage device includes a drive bracket for receiving the data storage device therein, and at least a slide rail attached to the data storage device. The bracket comprises two side walls, at least one of the side walls being provided with at least one supporting plate thereon and defining at least one first opening thereof. The slide rail rests on the supporting plate, comprises a main body and a handle demountably attached to the main body. The main body has a resilient arm, a fastening section and a stopper. The handle defines a second opening for engaging with the fastening section and stopper of the main body to attach the handle to the main body.

In assembly, the slide rail is attached to the data storage device to form a data storage device unit. The fastening section and the stopper are designed so that they can extend from the second opening of the handle, for further engaging in the first opening of the drive bracket, the data storage device unit is thus attached to the drive bracket. In disassembly, the handle is pulled forward so that it depresses the fastening section and the fastening section is disengaged from the at least one first opening of the drive bracket, whereby the data storage device can be removed from the drive bracket.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
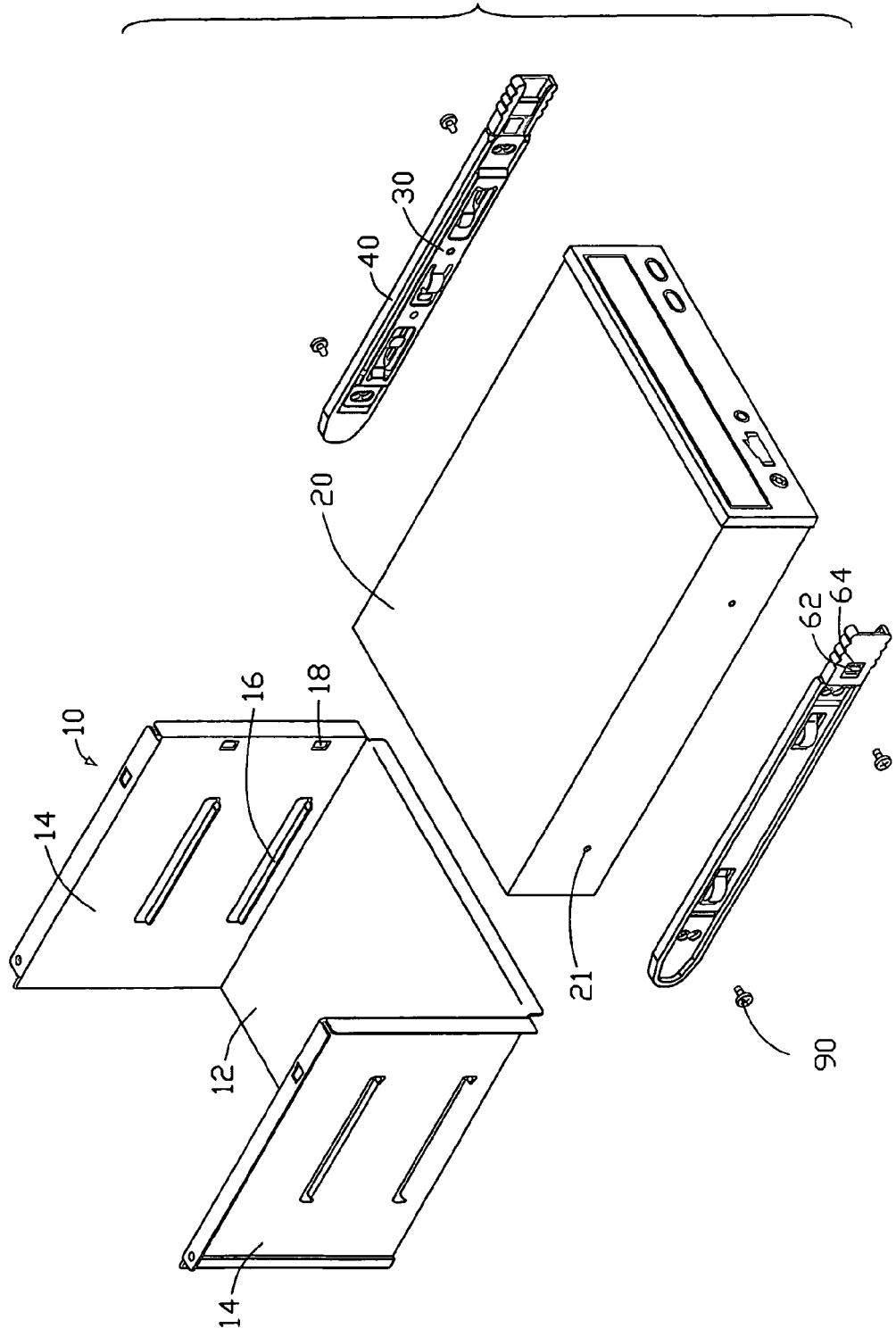
FIG. 1 is an exploded, isometric view of a mounting apparatus of the present invention, together with a data storage device, the mounting apparatus comprising a drive bracket, a pair of slide rails and a pair of grounding strips.

Referring to FIG. 1, a mounting apparatus of the present invention is for mounting a data storage device 20 in a drive bracket 10. The mounting apparatus comprises the drive bracket 10, a pair of grounding strips 30, and a pair of slide rails 40 wherein the slide rail 40 and the corresponding grounding strip 30 may be deemed as one combination.

The drive bracket 10 comprises a bottom wall 12, and a pair of upstanding side walls 14. The side walls 14 comprise two pairs of supporting plates 16 extending inwardly therefrom. Each supporting plate 16 in each pair of supporting plates 16 extends toward the other supporting plate 16. The side walls 14 each define a pair of first openings 18 near a front edge thereof, the first openings 18 corresponding to the supporting plates 16.

The data storage device 20 defines a plurality of fixing apertures 21 is opposite lateral sides thereof.

Figure 2:
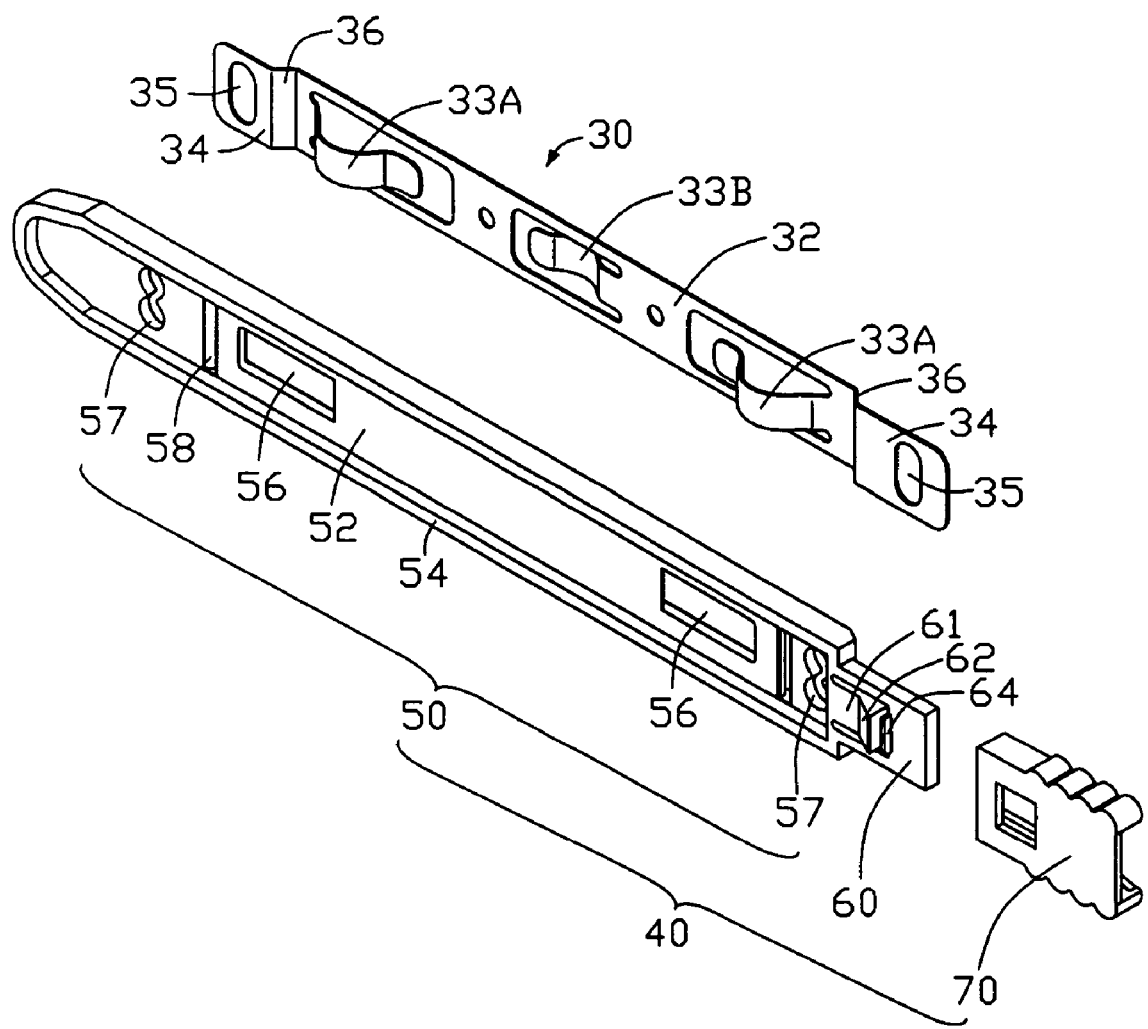
FIG. 2 an enlarged, exploded, isometric view of one of the slide rails and a corresponding one of the grounding strips of the mounting apparatus of FIG. 1.
Figure 3:
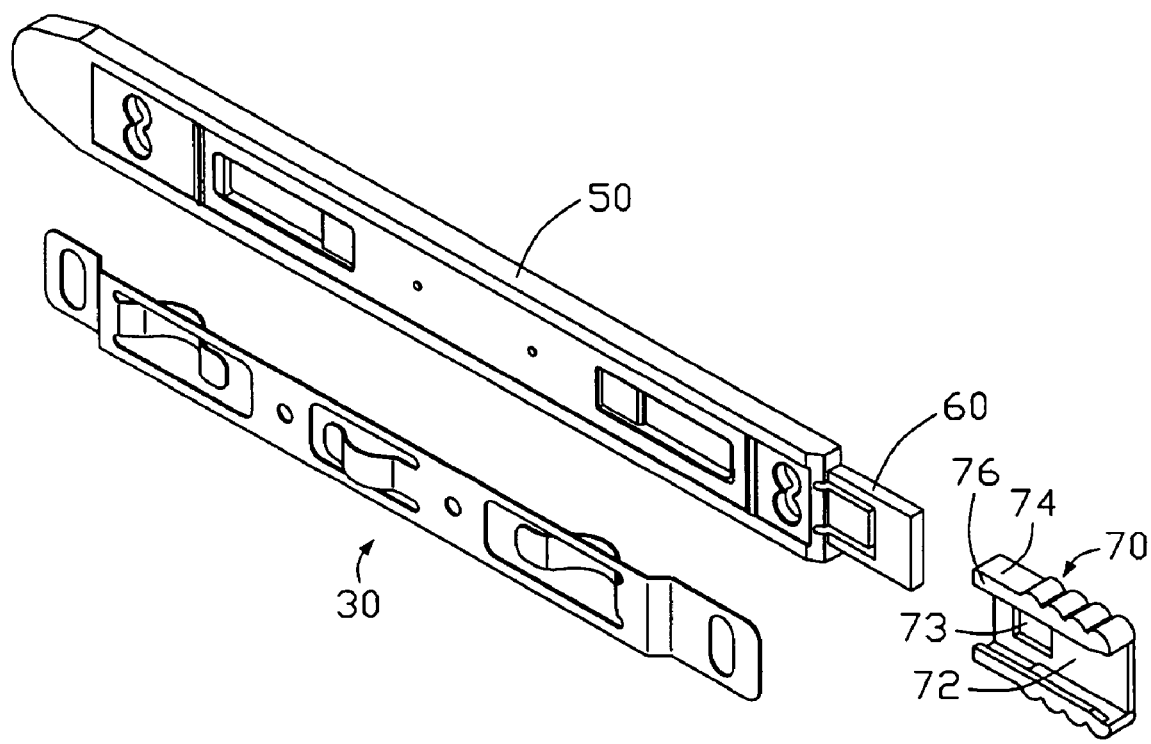
FIG. 3 is similar to FIG. 2, but viewed from another aspect.

Referring to FIGS. 2 and 3, each grounding strip 30 is elongate. The grounding strip 30 comprises a central section 32, a pair of fixing sections 34 at opposite ends of the central section 32 respectively, and a pair of slant sections 36 interconnecting the central section 32 with the fixing sections 34 respectively. The fixing sections 34 are coplanar with each other, and offset from but parallel to the central section 32. The central section 32 comprises a pair of spaced first arcuate tongues 33A, and a second arcuate tongue 33B between the first arcuate tongues 33A. The first arcuate tongues 33A project from the central section 32 in a first direction, and the second arcuate tongue 33B projects from the central section 32 in a second direction opposite to the first direction. The fixing sections 34 each define a first fixing hole 35 therein.

Each slide rail 40 comprises a body 50, an engaging portion 60 extending from an end of the body 50, and a handle 70 demountably attached to the engaging portion 60.

The body 50 comprises a main plate section 52, and a rib section 54 formed around a periphery of the plate section 52. The plate section 52 defines a pair of spaced rectangular slots 56 for receiving the first arch tongues 33A of a corresponding grounding strip 30, and a pair of second fixing holes 57 corresponding to the first fixing holes 35 of the grounding strip 30. A pair of slanted catches 58 is formed near opposite ends of the plate section 52 respectively, for abutting against the slant sections 36 of the grounding strip 30.

The handle 70 comprises a main plate 72, and a pair of flanges 74 extending from opposite top and bottom edges of the main plate 72 respectively. Each side plate 74 has an undulated outer surface, for facilitating convenient manual operation during assembly and disassembly. A railing 76 further extends vertically inwardly from a distal end of each flanges 74. The main plate 72, flanges 74 and railings 76 cooperatively define a receiving space therebetween, for receiving the engaging portion 60. The main plate 72 defines a second opening 73.

The engaging portion 60 comprises a resilient arm 61, a wedge-shaped fastening/latching section 62 formed on a free end of the arm 61, and a stopper 64 protruding from an outside of the engaging portion 60 and being spaced a small distance from the fastening section 62. The fastening section 62 is shaped so that it can engage in the second opening 73 of the handle 70 and further engage in a corresponding first opening 18 of the drive bracket 10.

In pre-assembly, the handle 70 of each slide rail 40 is slid over the engaging portion 60. The fastening section 62 is snappingly engaged in the second opening 73 of the handle 70, with the stopper 64 abutting an edge of the main plate 72 at a front of the opening 73. Each slide rail 40 is thus assembled.

Figure 4:
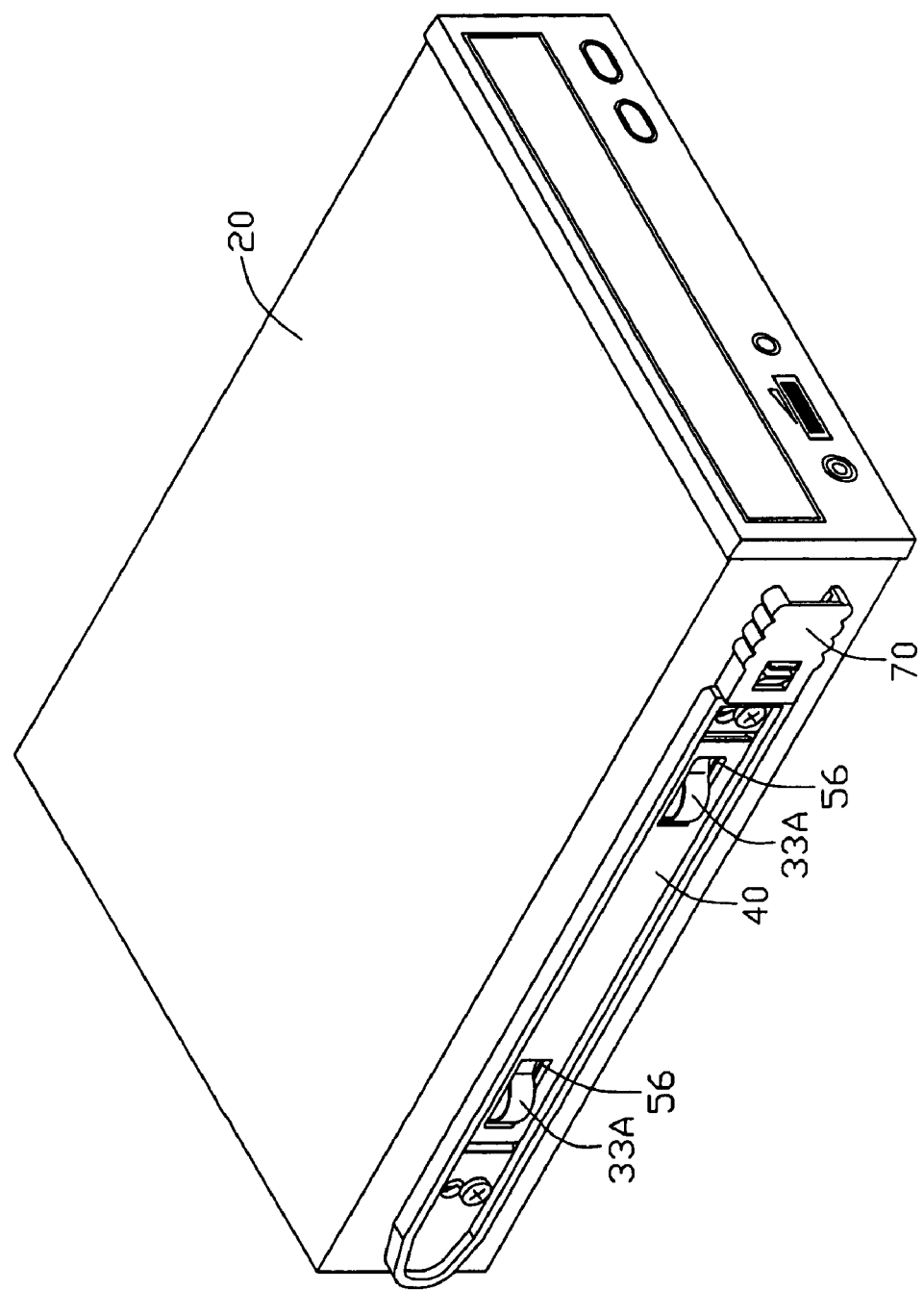
FIG. 4 is an assembled view of the data storage device, the slide rails and the grounding strips of FIG. 1.

Referring to FIG. 4, in assembly, each grounding strip 30 is attached to a corresponding slide rail 40. The first arcuate tongues 33A of the grounding strip 30 are received in the slots 56 of the slide rail 40. The first fixing holes 35 of the grounding strip 30 are aligned with the second fixing holes 57 of the slide rail 40. The combined grounding strip 30 and slide rail 40 is attached to a corresponding lateral side of the data storage device 20, with the first fixing holes 35 being aligned with the corresponding fixing apertures 21 of the data storage device 20. A pair of fasteners such as screws 90 is extended through the second fixing holes 57 of the slide rail 40 and the first fixing holes 35 of the grounding strip 30, and engaged in the fixing apertures 21 of the data storage device 20. The second arcuate tongue 33B resiliently presses on the lateral side of the data storage device 20. In this way, the slide rails 40 and corresponding grounding strips 30 are firmly attached to the opposite lateral sides of data storage device 20, thereby forming a data storage device unit.

Figure 5:
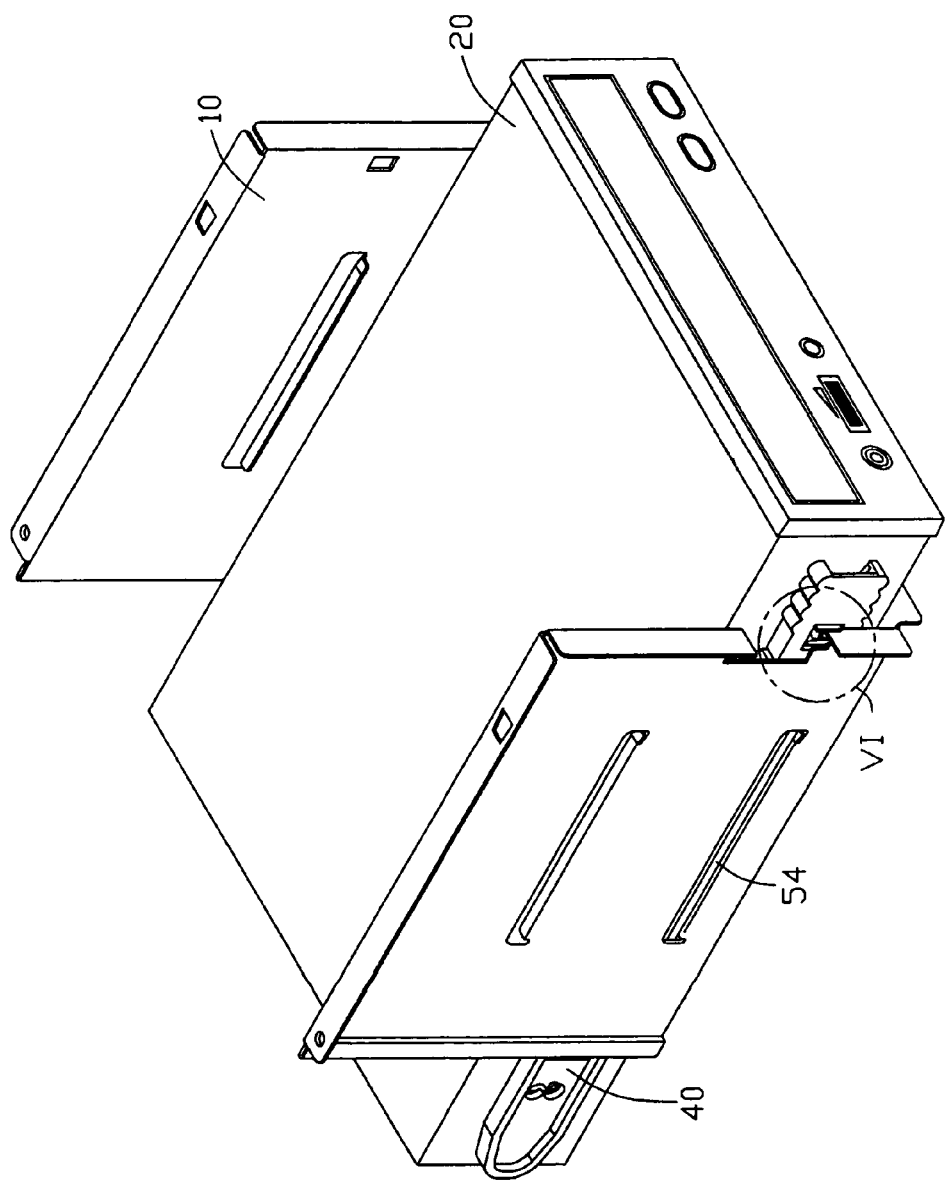
FIG. 5 is an assembled view of FIG. 1, with part of the drive bracket cut away.
Figure 6:
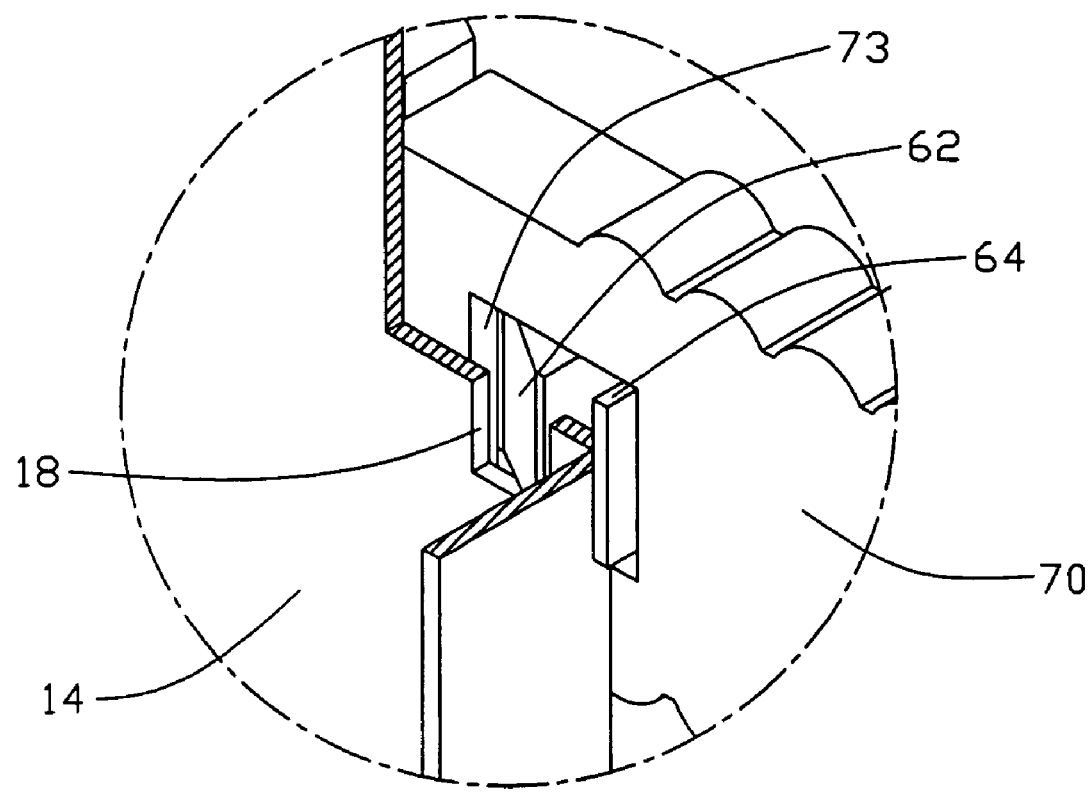
FIG. 6 is an enlarged view of a circled portion VI of FIG. 5.
Figure 7:
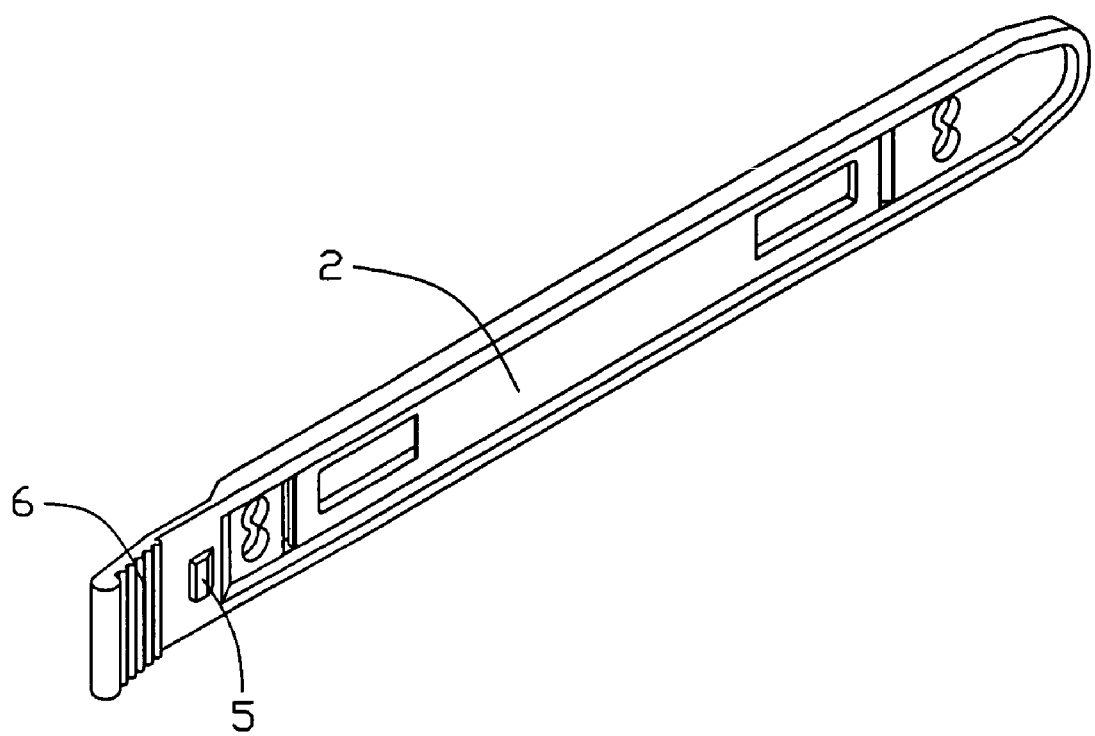
FIG. 7 is an isometric view of a slide rail of a conventional mounting apparatus.

Referring FIGS. 5 and 6, the rib sections 54 of the slide rails 40 are placed on a selected pair of the supporting plates 16 of the drive bracket 10. Then the data storage device unit is slid into the drive bracket 10 until the fastening sections 62 are snappingly engaged in the corresponding first openings 18 of the drive bracket 10, with the stoppers 64 abutting against frontmost portions of the corresponding side walls 14 of the drive bracket 10. The slide rails 40 are thereby prevented from sliding too far into the drive bracket 10. At this position, the first arcuate tongues 33A resiliently press on the side walls 14. The data storage device unit is thus securely attached to the drive bracket 10, with the data storage device 20 grounded to the drive bracket 10.

In disassembly, the handles 70 are pulled forward. Edges of the main plates 72 at rears of the openings 73 of the handles 70 ride along the fastening sections 62. The fastening sections 62 are thereby resiliently pressed inwardly, and are released from the first openings 18 of the drive bracket 10. The data storage device unit is then easily removed from the drive bracket 10.

In order to disengage the fastening sections 62 from the first openings 18 of the drive bracket 10, an operator applies pressures in directions parallel to the slide rails 40. Compare this with prior art apparatuses, in which pressures are applied in directions perpendicular to slide rails. Thus the mounting apparatus of the present invention is very convenient to use in application environments that have limited working space, such as with small-scale computer chassis.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for a data storage device, the mounting apparatus comprising:
    a bracket comprising a bottom wall and a pair of upstanding side walls, the side walls comprising a pair of supporting plates extending respectively therefrom, the side walls each defining a first opening near a front edge thereof corresponding to the respective supporting plate; and
    a pair of slide rails adapted to be attached to the data storage device and supported on the supporting plates of the bracket, each of the slide rails comprising a main body and a handle demountably attached to the main body, the main body having an arm, a fastening section and a stopper, the handle defining a second opening, the fastening section extending through the second opening and engaging in a corresponding first opening, the stopper limiting movement of the handle relative to the main body;
    wherein when the handles are pulled forward to ride over the fastening sections, the fastening sections are released from the first openings of the bracket, whereupon the data storage device can be removed from the bracket.

2. The mounting apparatus as described in claim 1, further comprising a pair of elongate grounding members attached to the slide rails respectively, each of the grounding members comprising a central section, and a pair of fixing sections at opposite ends of the central section respectively.

3. The mounting apparatus as described in claim 2, wherein the central section comprises a first arcuate tongue projecting therefrom in a first direction for resiliently pressing a corresponding side wall of the -bracket, and a second arcuate tongue projecting therefrom in a second direction opposite to the first direction for resiliently pressing the data storage device.

4. The mounting apparatus as described in claim 3, wherein the main body of each of the slide rails defines a slot receiving the first arcuate tongue of a corresponding grounding member therethrough.

5. The mounting apparatus as described in claim 2, wherein the fixing sections of each of the grounding members each define a first fixing hole therein, the main body of each of the slide rails defines a pair of second fixing holes corresponding to the first fixing holes, and a plurality of fasteners is respectively extended through the second and first fixing holes for engagement in the data storage device.

6. The mounting apparatus as described in claim 2, wherein a pair of slant sections interconnects the central section and the fixing sections, a pair of slanted catches is provided on the main body of each of the slide rails, the slanted catches abutting against the slant sections of a corresponding grounding member.

7. The mounting apparatus as described in claim 1, wherein the fastening section of each of the slide rails is wedge-shaped, and is formed on a free end of the arm, and the stopper protrudes from an outside of the main body and is spaced a distance from the fastening section.

8. The mounting apparatus as described in claim 1, wherein the handle comprises a main plate and a pair of flanges extending respectively from opposite edges of the main plate, and the flanges each have an undulated surface for facilitating manual operation.

9. The mounting apparatus as described in claim 8, wherein a railing extends vertically from a distal end of each of the flanges; the main plate, flanges and railings cooperatively defining a receiving space therebetween for receiving the main body.

10. A mounting apparatus assembly comprising:
a data storage device;
a support member comprising two side walls that generally define a space for receiving the data storage device, at least one of the side walls being provided with at least one supporting plate on an inner face thereof and defining at least one first opening near a front edge thereof corresponding to the at least one supporting plate; and
at least one slide rail attached to the data storage device and slidably resting on the at least one supporting plate of the support member, the at least one slide rail comprising a main body having a fastening section and a stopper, and a handle removably attached to the main body, the handle defining a second opening for receiving the fastening section and the stopper; wherein
in assembly, the fastening section and stopper of the main body extend through the second opening of the handle and engage in the at least one first opening of the drive bracket, thus attaching the data storage device to the drive bracket; and in disassembly, the handle is pulled forward so that it depresses the fastening section and the fastening section is disengaged from the at least one first opening of the drive bracket, whereby the data storage device can be removed from the drive bracket.

11. The mounting apparatus assembly as described in claim 10, further comprising a grounding member sandwiched between the data storage device and the at least one slide rail.

12. The mounting apparatus assembly as described in claim 11, wherein the grounding member comprises a pair of first arcuate tongues projecting therefrom in a first direction for resiliently pressing on a corresponding side wall of the bracket, and a second arcuate tongue projecting therefrom in a second direction opposite to the first direction for resiliently pressing on the data storage device.

13. The mounting apparatus assembly as described in claim 12, wherein the main body of the at least one slide rail defines a pair of slots corresponding to the first arcuate tongues of the grounding member.

14. The mounting apparatus assembly as described in claim 11, wherein a plurality of fasteners successively extends through the at least one slide rail and the grounding member, and engages with the data storage device.

15. The mounting apparatus assembly as described in claim 10, wherein the main body of the at least one slide rail further has a resilient arm, and fastening section of the at least one slide rail is wedge-shaped and formed on a free end of the arm, the stopper protrudes from an outside of the main body, and the stopper abuts a front edge of a corresponding side wall for preventing the at least one slide rail from sliding too far into the support member.

16. The mounting apparatus assembly as described in claim 10, wherein the handle comprises a main plate and a pair of flanges extending respectively from opposite edges of the main plate, and the flanges each have an undulated surface for facilitating manual operation.

17. The mounting apparatus assembly as described in claim 16, wherein a railing extends vertically from a distal end of each of the flanges; the main plate, flanges and railings cooperatively defining a receiving space therebetween for receiving the main body.

18. A mounting apparatus assembly comprising:
a data storage device;
a supporting member defining opposite two side walls with a space therebetween so as to allow said data storage device to be inserted thereinto in a front-to-back direction;
a combination including one slide rail and a corresponding grounding strip associated therewith commonly mounted to one side of said data storage device corresponding to one of the side walls;
said combination forming a deflectable latching section; and
a handle mounted to said combination and moveable relative thereto; wherein
said data storage device is fixedly received in the space by engagement between the latching section and said one of the side walls, while is allowed to be removed from the space in a direction opposite to said front-to-back direction by movement of said handle relative to the combination to inwardly deflect said latching section for disengaging said latching section from said one of the side walls.

19. The assembly as described in claim 18, wherein said handle is moveable relative to the combination along either said front-to-back direction or said direction.

20. The assembly as described in claim 18, wherein said one of said side walls defines a recess close to a front edge thereof to receive said latching section therein when assembled.

21. The assembly as described in claim 18, wherein said combination further defines a stopper to not only abut against said one of the side walls for preventing excessive forward movement of the data storage device after assembled, but also restrict back-and-forth movement of said handle relative to said combination.

\* \* \* \* \*